(12) United States Patent
Munaux

(10) Patent No.: US 10,207,464 B2
(45) Date of Patent: Feb. 19, 2019

(54) METHOD FOR DEFINING FIBER TRAJECTORIES FROM CURVES OR CONSTRAINT GRID

(71) Applicant: CORIOLIS COMPOSITES TECHNOLOGIES, Queven (FR)

(72) Inventor: Olivier Munaux, Ploemeur (FR)

(73) Assignee: Coriolis Composites Technologies, Queven (FR)

( * ) Notice: Subject to any disclaimer, the term of this patent is extended or adjusted under 35 U.S.C. 154(b) by 361 days.

(21) Appl. No.: 14/893,365

(22) PCT Filed: May 20, 2014

(86) PCT No.: PCT/FR2014/000109
§ 371 (c)(1),
(2) Date: Nov. 23, 2015

(87) PCT Pub. No.: WO2014/188085
PCT Pub. Date: Nov. 27, 2014

(65) Prior Publication Data
US 2016/0121557 A1    May 5, 2016

(30) Foreign Application Priority Data

May 22, 2013  (FR) ..................................... 13 01170

(51) Int. Cl.
*B29C 70/38*     (2006.01)
*G05B 19/4097*   (2006.01)
*B29C 70/30*     (2006.01)

(52) U.S. Cl.
CPC ........ *B29C 70/382* (2013.01); *G05B 19/4097* (2013.01); *B29C 70/30* (2013.01); *G05B 2219/45238* (2013.01)

(58) Field of Classification Search
CPC ..... B29C 70/30; B29C 70/382; B29C 70/384; B29C 51/10; B29C 51/145; B32B 37/025; G05B 19/4097; G05B 2219/45238
(Continued)

(56) References Cited

U.S. PATENT DOCUMENTS

| | | |
|---|---|---|
| 4,696,707 A | 9/1987 | Lewis |
| 5,041,179 A | 8/1991 | Shinno et al. |

(Continued)

FOREIGN PATENT DOCUMENTS

WO    WO 2013/112114 A1    8/2013

OTHER PUBLICATIONS

PCT International Search Report for PCT/FR2014/000109, dated Oct. 16, 2014, 4 pgs.
(Continued)

*Primary Examiner* — Shahed Ahmed
(74) *Attorney, Agent, or Firm* — Patterson Thuente Pedersen, P.A.

(57) ABSTRACT

A method for defining trajectories of fibers on a layup surface for producing at least one ply having a given theoretical orientation, by laying up fibers, including the steps of providing the definition of the constraint curves and/or the definition of at least one constraint grid with association of at least one constraint vector to each node of the constraint grid, the direction of a fiber at an analysis point of the layup surface, being obtained by calculation of the normalized weights of the constraint vectors of the constraint curves and/or by calculation by of the normalized weights of the constraint vectors of the constraint grid, and by weighting by the normalized weights of the constraint vectors.

11 Claims, 15 Drawing Sheets

(58) Field of Classification Search
USPC .................. 700/97, 187, 103, 131, 262
See application file for complete search history.

(56) References Cited

U.S. PATENT DOCUMENTS

| | | |
|---|---|---|
| 6,191,796 B1 | 2/2001 | Tarr |
| 6,714,901 B1 | 3/2004 | Cotin et al. |
| 7,180,523 B1 | 2/2007 | Macri et al. |
| 7,190,374 B2 | 3/2007 | Lake et al. |
| 9,481,135 B2 | 11/2016 | Munaux |
| 2005/0042410 A1 | 2/2005 | Sakonjo et al. |
| 2006/0103648 A1 | 5/2006 | Wu et al. |
| 2009/0048812 A1 | 2/2009 | Hanisch et al. |
| 2010/0095526 A1 | 4/2010 | Derrien et al. |
| 2010/0136293 A1 | 6/2010 | Kubryk et al. |
| 2012/0226482 A1 | 9/2012 | Wu et al. |
| 2013/0041635 A1 | 2/2013 | Zhu et al. |
| 2013/0231902 A1 | 9/2013 | Luby et al. |
| 2014/0288895 A1 | 9/2014 | Fricero et al. |
| 2015/0279029 A1* | 10/2015 | Jensen ............. G06T 7/0012 382/131 |
| 2016/0082672 A1 | 3/2016 | Munaux |
| 2016/0121558 A1 | 5/2016 | Munaux et al. |
| 2016/0136899 A1* | 5/2016 | Koranne ............ B29C 67/0088 700/98 |

OTHER PUBLICATIONS

Search Report dated Oct. 21, 2014 for PCT Application No. PCT/FR2014/000108, 4 pages.
Search Report dated Oct. 16, 2014 for PCT Application No. PCT/FR2014/000110, 4 pages.
Application and File history for U.S. Appl. No. 14/893,402, filed Nov. 23, 2015. Inventors: Munaux et al.
Application and File history for U.S. Appl. No. 14/893,310, filed Nov. 23, 2015. Inventors: Munaux.

* cited by examiner

METHOD FOR DEFINING FIBER TRAJECTORIES FROM CURVES OR CONSTRAINT GRID

RELATED CASES

The present application is a National Phase entry of PCT Application No. PCT/FR2014/000109, filed May 20, 2014, which claims priority from FR Patent Application No. 1301170, filed May 22, 2013, which applications are hereby incorporated by reference in their entireties.

TECHNICAL FIELD

The present invention relates to the manufacture of parts made of composite material by automatic fiber layup machines, and more particularly to a method of defining fiber trajectories on a layup surface for automatic layup machines.

BACKGROUND ART

There are known composite material parts produced by methods called fiber placement, by superposing several plies of fiber in different directions. In this document, the term "fiber placement" refers to the placement of tows, in which each ply is made by laying up in contact on a mold of bands side by side, each band being formed of several independent tows arranged side by side, and the placement of bands in which each ply is formed by laying up in contact on a mold of bands side by side, each band being formed of a single tow, of a greater width than in the case of the placement of tows. The tows typically used are unidirectional and include a multitude of filaments. The laid fibers can be pre-impregnated with resin or not. The technology for the placement of tows, using tows of a smaller width, enables laying up on layup surfaces of complex shapes. Parts are manufactured by automatic placement machines, to which are given the trajectories of fibers to produce the plies. In the case of the placement of tows, these machines are typically called fiber placement machines or AFP machines (Automated Fiber Placement) and tape placement machines or ATP machines (Automated Tape Placement) in the case of the placement of bands.

The fiber trajectories are typically defined by software by means of a rosette, consisting of a system of axes associated to a transfer method which enables the definition of a fiber direction on all points of a surface. Today there are different rosettes, based on different transfer methods, which are recognized and used in the aerospace sector according to the layup surface, such as for example Cartesian rosette or the translation rosette.

Each trajectory is generated by defining the direction of the trajectory at different analysis points of the layup surface, also called propagation points, by transfer of the axes system to said analysis point according to the associated transfer method. These transfers of the axis system for the propagation points require calculation time which can prove to be relatively long, particularly in the case of complex surfaces.

The trajectories obtained are then typically subjected to a curvature analysis, commonly called "steering" analysis, and/or an angular deviation analysis. The steering analysis at an analysis point of a trajectory consists of calculating the value of the mean radius of curvature in the plane tangent to the surface at the analysis point.

Following these analysis results, the trajectories must be redefined manually to adjust the trajectories to the acceptable or achievable minimum radii of curvature with a given fiber, and to the maximum angular deviation desired by the designer of the part. Therefore, the definition of the trajectories can prove to be long and tedious.

In the case of non-continuous layup surfaces comprising recesses and/or embossments, in particular for producing reinforcements, the positioning of prefabricated reinforcements, the positioning of honeycombs or others, the definition of satisfactory trajectories at the level of these discontinuities proves to be complicated, and requires lengthy manual operations.

SUMMARY OF THE INVENTION

The purpose of the present invention is to propose a solution aiming to overcome at least one of the aforementioned disadvantages.

To this end, embodiments of the present invention provide a method for defining the trajectories of the fibers on a layup surface for producing at least one ply having a given theoretical orientation, for producing of parts made of composite material by the laying up of fibers, wherein the method comprises the definition of constraint curves, and/or the definition of at least one constraint grid from the definition of the layup surface, with association of at least one constraint vector to each node of the constraint grid, the constraint curves and the constraint vectors being representative of geometric constraints, geodesic curvature radius constraints, angular deviation constraints and/or stress constraints, the direction of a fiber at an analysis point of the layup surface, for the definition of the trajectory of said fiber for at least one orientation of the plies, being obtained by calculation of the normalized weights of the constraint vectors of the constraint curves and/or by calculation of the normalized weights of the constraint vectors of the constraint grid, and by weighting by the normalized weights of the constraint vectors.

According to embodiments of the invention, the definition of the trajectories is made by taking into account manufacturing and/or design constraints, these constraints being modeled under the form of constraint curves or vectors associated to the nodes of a constraint grid, the direction to an analysis point being defined by applying a weighting law to the constraint vectors associated to the analysis point and issued from the constraint curves and/or constraint grid. The method according to embodiments of the invention enables the incorporation of design and/or manufacturing constraints during the definition of the trajectories, thereby reducing the time for defining the trajectories.

The method according to the invention can be implemented automatically under the form of software. The method according to the invention can be used for producing parts made of composite material by laying up fibers, whether by layup by contact, such as by placement of tows or by placement of bands, or by layup without contact such as by filament winding. The method according to embodiments of the invention is of particular interest in the case of the placement of tows on non-planar layup surfaces.

According to one embodiment, the trajectories are made directly from the constraint grid or the constraint curves, each trajectory of fibers is then obtained by defining the directions of the fiber at several analysis points of the layup surface.

According to another embodiment, a vector field is made from the constraint grid or the constraint curves, such as described in the patent application filed by the applicant, and entitled "Method for defining the trajectories from a vector field". The trajectories are then made from said vector field.

According to one embodiment, in the case of a constraint grid, the method includes the definition of a constraint grid, each element of said constraint grid constraint preferably being defined by four nodes, and the association of at least one constraint vector to each node of the constraint grid, the direction of a fiber at an analysis point of the layup surface being obtained by:
  definition of a projected point by normal projection of an analysis point on the constraint grid,
  calculation of the normalized weights to the projected point of the four nodes,
  weighting of the four constraint vectors by the normalized weight to obtain a vector at the projected point, and normal projection of this vector at the analysis point to obtain the direction of the fiber at the analysis point.

According to one embodiment the constraint vectors of the constraint grid are representative of the geometric constraints of the layup surface.

According to one embodiment, in the case of constraint curves, the method includes the definition of at least two constraint curves, preferably on the mesh of the layup surface, the direction of a fiber at an analysis point of the layup surface being obtained by:
  normal projection of an analysis point of the element, on the two constraint curves between which the analysis point is positioned,
  definition, at the projected points, of the constraint vectors tangent to the constraint curves,
  calculation of the normalized weights of the projected points at the analysis point;
  and weighting of the two constraint vectors by their respective normalized weights to obtain the direction of the fiber at the analysis point.

According to one embodiment, the constraint curves are representative of geometric constraints of the layup surface.

According to another embodiment, the constraint curves are representative of maximum angular deviation values, and are obtained from a so called angular deviation grid, and reference directions. These reference directions are for example obtained from a classic rosette, a constraint grid or constraint curves, the angular deviation grid serving to reorientate these reference directions within angular deviation limits in order to be closer to the geodesics thereby limiting the radius of curvature of the fibers. In this embodiment, the method comprises the definition of an angular deviation grid, each element of the angular deviation grid preferably being defined by four nodes, and the association of at least one maximum angular deviation value to each node of the angular deviation grid, the definition of a constraint curve comprising the definition of propagation directions at different analysis points of the layup surface, the definition of a propagation direction in an analysis point including:
  obtaining a first reference direction at the analysis point of the mesh of the layup surface from the direction data associated to a transfer method,
  the normal projection of the point on the angular deviation grid,
  the calculation of normalized weights at the projected point of the four nodes of the element of the angular deviation grid,
  the weighting of the four maximum angular deviation values of the element by the normalized weights to obtain a maximum angular deviation value associated to said analysis point,
  the reorientation of the first reference direction from said maximum angular deviation value to obtain the propagation direction of the point of analysis.

According to one embodiment, the reorientation step of the reference direction includes:
  the definition of a tolerance sector around the first reference direction by defining the direction limits at an angle of more or less the maximum angular deviation value associated to the analysis point,
  the determination of a geodesic direction at the analysis point,
  the propagation direction at the propagation point being equal to the geodesic direction if the geodesic direction is included in the tolerance sector, and is equal to the direction limit closest the geodesic direction, if the geodesic direction is not included in the tolerance sector.

According to one embodiment, the method includes the definition of a finite element transfer mesh of a transfer surface corresponding to a simplified surface, substantially continuous, of the layup surface, the direction of a fiber at an analysis point of the layup surface being obtained by:
  definition of a projected point obtained by normal projection of an analysis point, on the transfer mesh,
  definition of a second reference direction at the projected point, from the direction data associated to a transfer method,
  definition of the normal to the transfer element,
  definition of a cutting plane the cutting plane being defined by the projected point, the second reference direction and the normal,
  definition of the line of intersection of the cutting plane with the plane of the element, the direction of the fiber at the analysis point being obtained from the direction of this line of intersection.

The use of such a simplified transfer surface for the transfer of direction data proves itself to be particularly effective for the definition of acceptable trajectories in terms of the radius of curvature and of angular deviation in the case of non-continuous layup surfaces, having recesses and/or embossments generating ramps.

In the case of using of an angular deviation grid in combination with a constraint grid, the first reference direction at the analysis point is obtained from a constraint grid by:
  definition of a point projected by normal projection of the analysis point, on the constraint grid,
  calculation of normalized weights at the projected point of the four nodes,
  weighting of the four constraint vectors by the normalized weights to obtain a vector at the projected point, the first reference direction being obtained by projection of the vector at the analysis point.

In the case of using a transfer surface in combination with an angular deviation grid, the first reference direction at the analysis point is obtained from a transfer surface, by:
  definition of a projected point by normal projection of the analysis point of the element, on the transfer mesh,
  definition of a second reference direction to the projected point,
  definition of the normal to the transfer element, definition of a cutting plane, the cutting plane being defined by the projected point, the second reference direction and the normal, definition of the line of intersection of the cutting plane with the plane of the element, the first direction reference corresponding to the direction of this line of intersection.

In the case of using a transfer surface in combination with a constraint grid and possibly an angular deviation grid, the second reference direction at said projected point is obtained from a constraint grid by:

definition of a second projected point by normal projection of the point of the transfer element, on the constraint grid, calculation of the normalized weights at the second projected point of the element of the constraint grid of the four nodes of the element, weighting of the four constraint vectors by the normalized weights to obtain a vector at the second projected point, the second reference direction being obtained by projection of the vector to the projected point of the transfer element.

In the case of using an angular deviation grid in combination with constraint curves, obtained for example from geometrical constraints, the first reference direction at the analysis point is obtained from a constraint grid by:

normal projection of the analysis point on the two constraint curves between which the analysis point is positioned, definition of the projected points of the constraint vectors tangent to the constraint curves, calculation of the normalized weights of the points projected at the analysis point;

and weighting of two constraint vectors by their respective normalized weights to obtain a vector which corresponds to the first reference direction.

In the case of using a transfer surface in combination with constraint curves, obtained for example from geometric constraints, and possibly an angular deviation grid, the second reference direction at the projected point is obtained from a constraint grid by:

definition of second projected points by normal projection of the projected point of the transfer element on the two constraint curves between which the projected point is positioned, definition of the second projected points of the tangent constraint vectors to the constraint curves, calculation of the normalized weights of the second projected points of the constraint curves at the projected point;

weighting of two constraint vectors by their respective normalized weights to obtain a vector, the second reference direction corresponding to the vector.

Following the lay-up surface, constraint curves and/or a constraint grid defined for an orientation of a ply can be used for the other orientations. In this case, once the directions of the fibers defined for a first orientation of the ply, for example 0°, the directions of the fibers for the other orientations of the plies, for example, 90°, +/−45°, are obtained by simple rotation of the vectors obtained for the first direction.

Embodiments of the present invention also concern a process for manufacturing parts made of composite materials by an automatic fiber layup machine, characterized in that the trajectories of the fibers for the layup of plies by the layup machine are defined by the method for defining the trajectory as described previously.

Embodiments of the present invention also concern a computer program comprising a set of instructions capable of implementing the method for defining the trajectory such as described previously, when the program is executed on a computer.

DESCRIPTION OF THE DRAWINGS

The invention will be better understood, and the other objectives, details, characteristics and advantages will appear more clearly during the detailed explanatory description which follows several specific embodiments currently preferred from the invention, with reference to the appended schematic drawings, in which.

DETAILED DESCRIPTION

Figure 1:
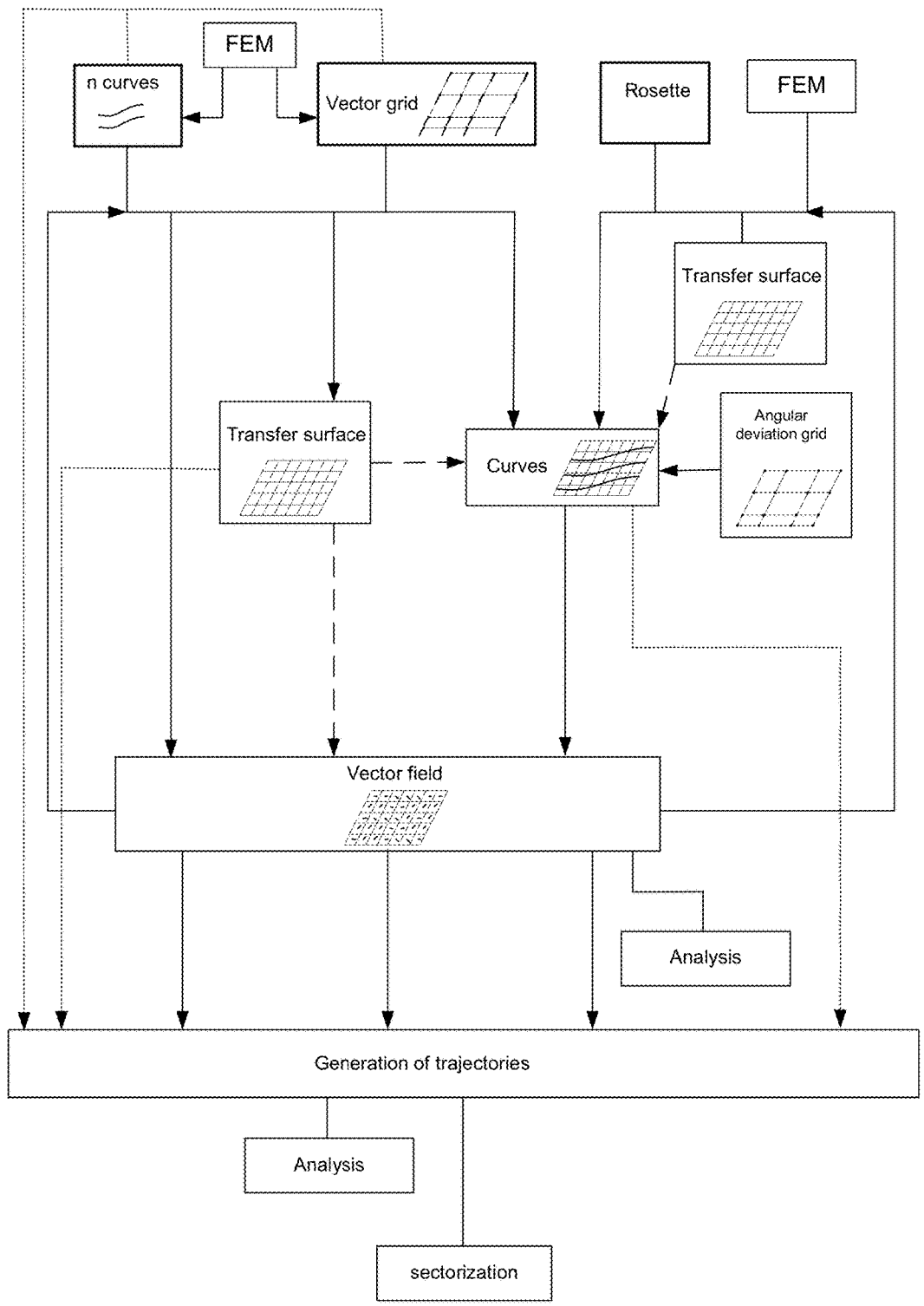
FIG. 1 is a general diagram illustrating different embodiments of the method according to the invention.

According to embodiments of the invention, as shown in FIG. 1, the trajectories of the fibers are defined from constraint curves and/or a constraint grid, possibly in combination with the use of a transfer surface and/or constraint curves obtained from an angular deviation grid. The trajectories can be generated using a vector field formed from a mesh of the layup surface in which a direction vector is associated to each element.

Figure 2:
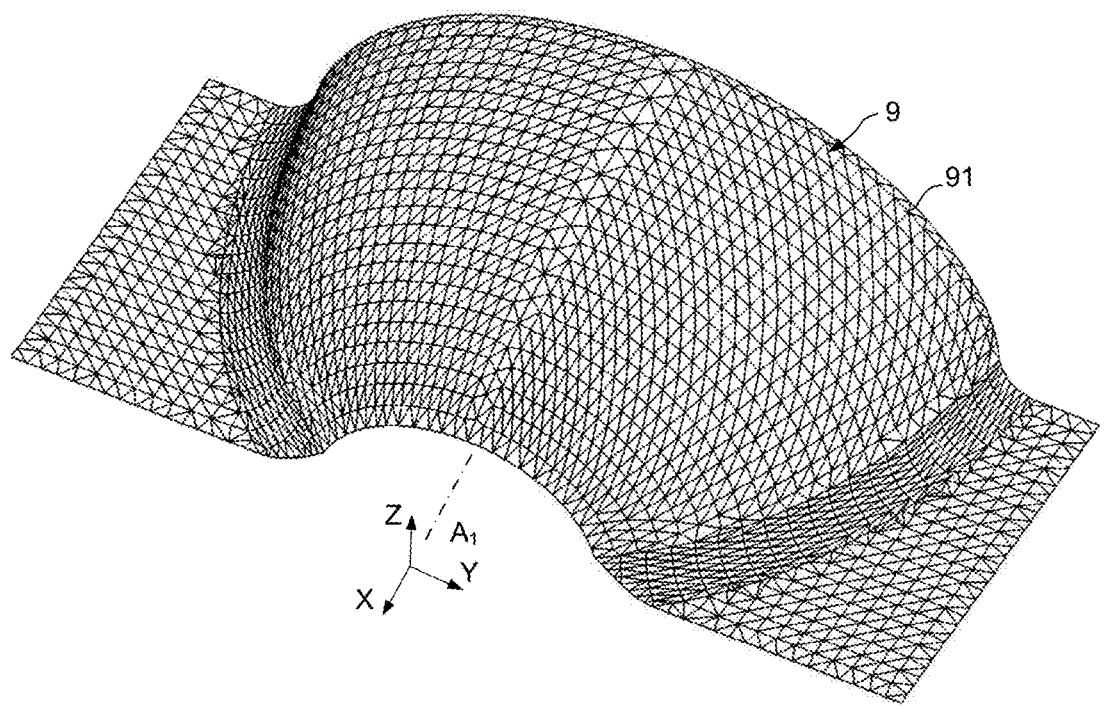
FIG. 2 is a perspective view of an example of layup surface used to illustrate the method according to embodiments of the invention.

FIG. 2 illustrates a lay-up surface 9 used by way of example to illustrate different embodiments of the method for defining the fiber trajectories according to the invention. This layup surface is a double curvature surface, and is defined by a finite element mesh 91.

Figure 3:
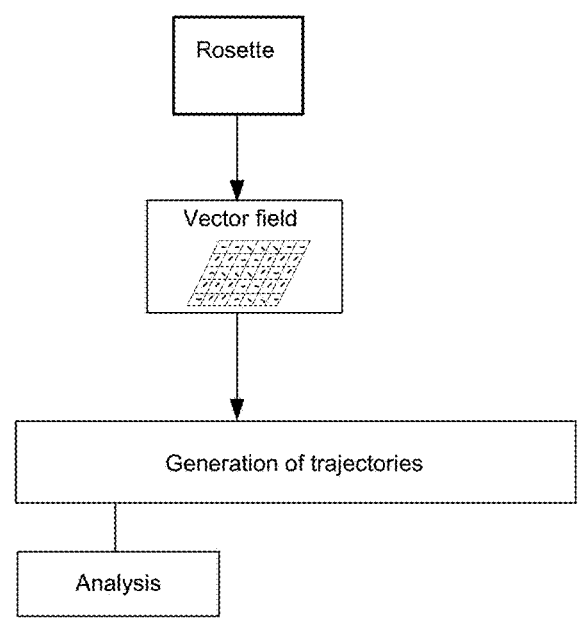
FIG. 3 is a diagram illustrating a method for defining trajectories, using a vector field obtained from a classic rosette.

FIG. 3 illustrates a vector field that is obtained from a classic rosette, such as a Cartesian rosette comprising a reference coordinate system defined by three orthogonal vectors X, Y, Z and a Cartesian transfer method. In the case of the layup surface of FIG. 2, the vector X of the so-called global rosette is aligned with the main axis $A_1$ or rotation axis of the layup surface.

Figure 4:
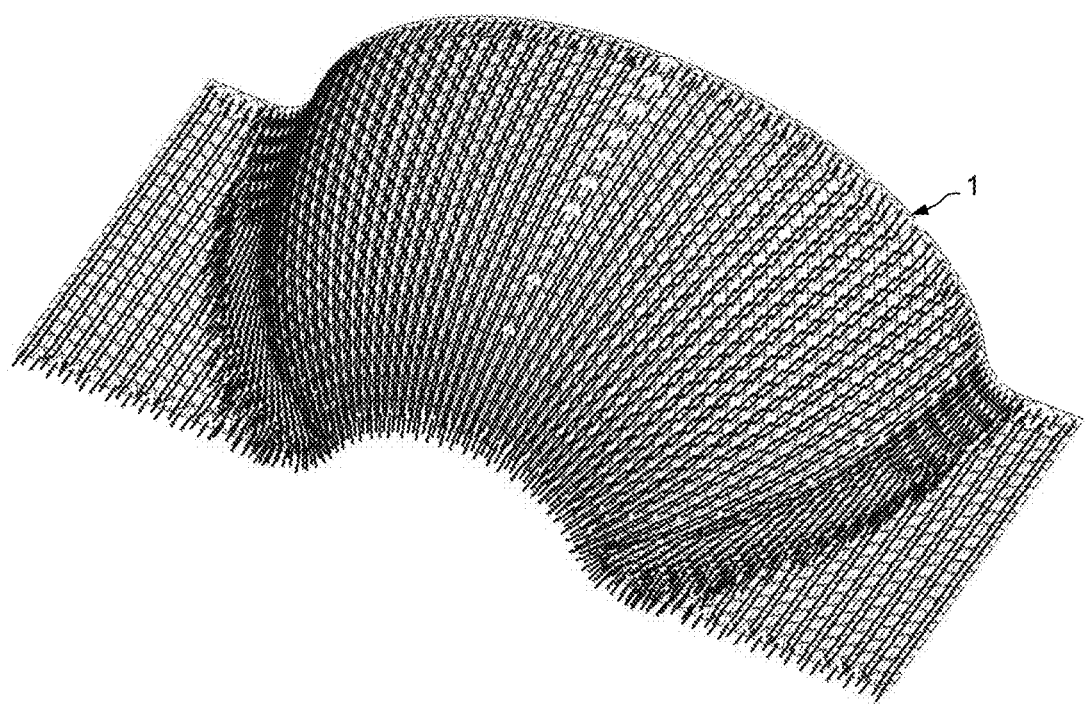
FIG. 4 is a perspective view of the vector field obtained according to the method for FIG. 3.
Figure 5:
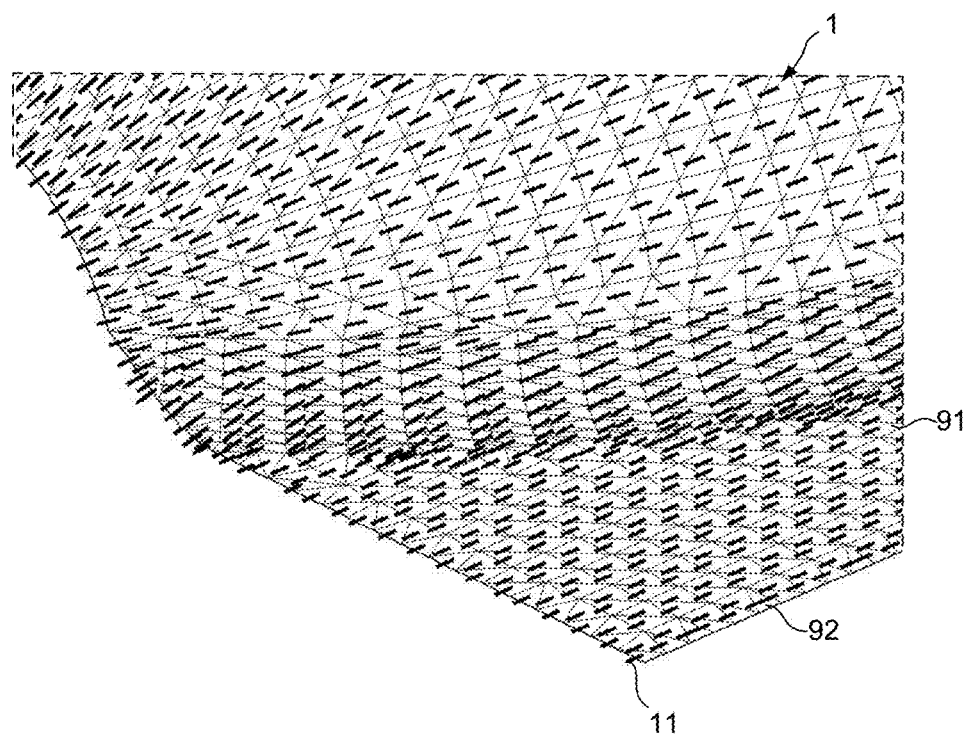
FIG. 5 is a partial enlarged view of FIG. 4.

The vector field is obtained using the Cartesian transfer of the vector X of the global rosette on each element 92 of the mesh, the Cartesian transfer of the vector X on the element consisting of a normal projection of the vector X on the plane of the relevant element, the projected vector of the so-called projected rosette constituting the direction vector 11 of the element. FIGS. 4 and 5 illustrate the resulting vector field 1.

Figure 6A:
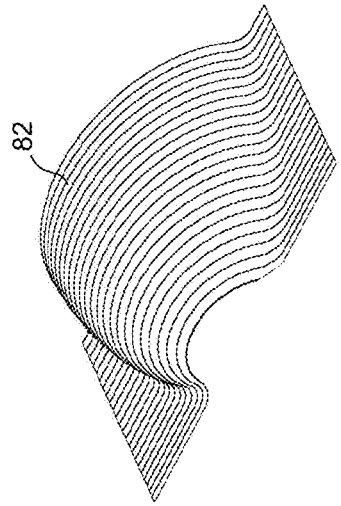
FIG. 6A is a perspective view of the fiber trajectories for a ply at 0°, obtained from the vector field of FIG. 4.

Trajectories 81 of the fiber for a ply orientation at 0° can then be generated from this vector field 1, as shown in FIG. 6A. Each trajectory is generated by defining the direction of the trajectory at different analysis points, also called propagation points, the direction at a propagation point is that of the direction vector of the element to which the propagation point belongs to.

Figure 6B:
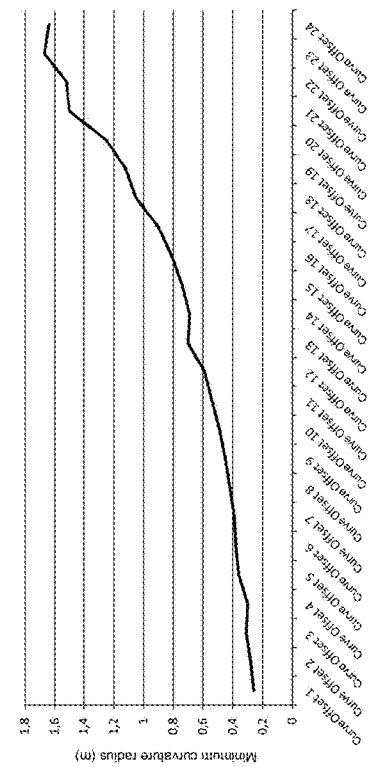
FIG. 6B presents an analysis of the radius of curvature of the trajectories.

A radius of curvature of analysis can then be performed on these thus obtained trajectories. FIG. 6B illustrates the minimum radius of curvature of each trajectory. This analysis of the radius of curvature importantly shows radii of curvature that are incompatible for example with the placement of tows of a quarter of an inch in width, for which a minimum radius of curvature of approximately 2 meters is typically advocated.

An analysis of the radius of curvature and/or angular deviation can be performed directly from the vector field, without generating trajectories, this analysis may for example be displayed on the vector field by assigning different colors to the vectors according to the values of the radius of curvature or the angular deviation.

Figure 7A:
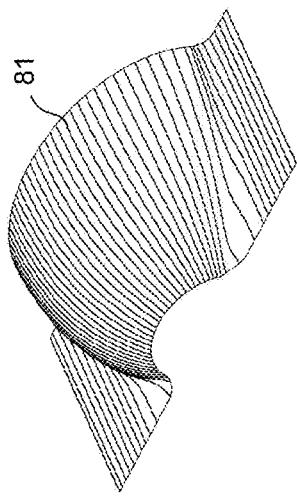
FIG. 7A is a perspective view of the fiber trajectories for a ply at 90°, obtained from the vector field of FIG. 4.
Figure 7B:
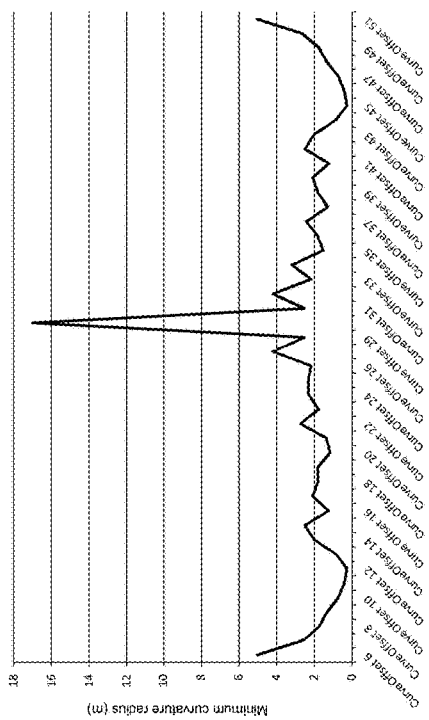
FIG. 7B is an analysis of the radius of curvature of the trajectories.

Fiber trajectories for other ply orientations, such as 90°, +45° or −45°, can be generated from the same vector field 1, by performing a corresponding rotation of the direction vectors. FIG. 7A illustrates the fiber trajectories for a ply orientation at 90°, obtained by performing a 90° rotation of the direction vectors of the vector field 1. FIG. 7B illustrates the minimum radius of curvature of each trajectory.

Figure 8:
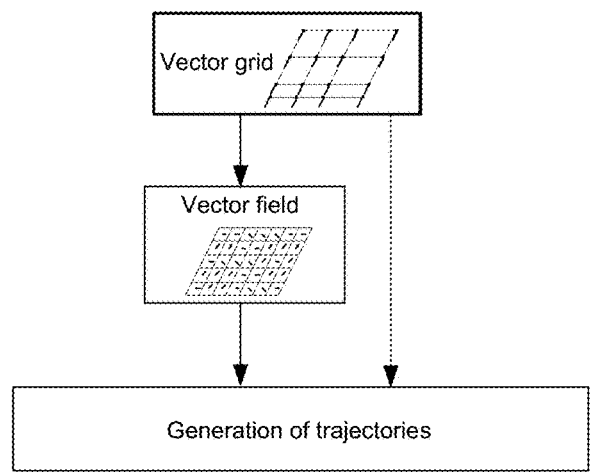
FIG. 8 is a diagram illustrating a method for defining the trajectories, according to the first embodiment of the invention, using a vector field obtained from a constraint vector grid.

FIG. 8 illustrates a first embodiment of the invention in which a vector field is obtained from a constraint grid, to take into account the design and/or manufacturing constraints within the definition of the trajectories, and thus obtain trajectories with an acceptable radius of curvature.

Figure 9:
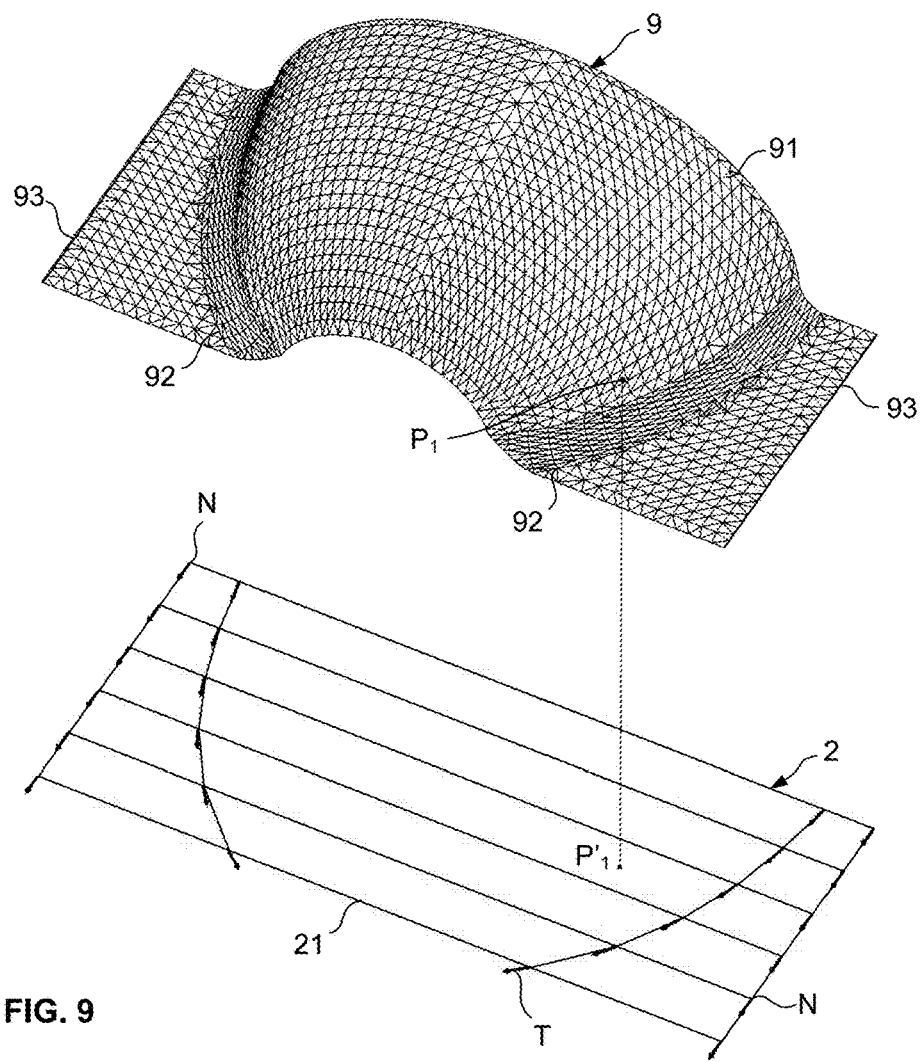
FIG. 9 is a schematic perspective view of the constraint grid defined from the lay-up surface.

With reference to FIG. 9, one defines in the first instance a constraint grid 2, also called constraint vector grid. In this example, the constraint grid is defined according to the geometric constraints of the layup surface, here the geometric constraints being the following:

the fibers of the ply at 0° must follow the generatrix line 92 of the connecting radii between the globally frustoconical central part of the layup surface and the planar parts on either side of said frustoconical part, and the fibers of the ply at 0° must be aligned with the outer edges 93 of the planar parts.

A mesh 21 is defined from these geometric constraints, each element of the mesh being formed of at least four nodes, then a constraint vector T is assigned to each node N of the mesh to form the constraint grid 2.

To form the vector field, the direction vector of each mesh element is defined in the following manner.

As shown in FIG. 9, one performs a normal projection of the center point $P_1$ of the element, to the nearest point, on the constraint grid.

Figure 10:
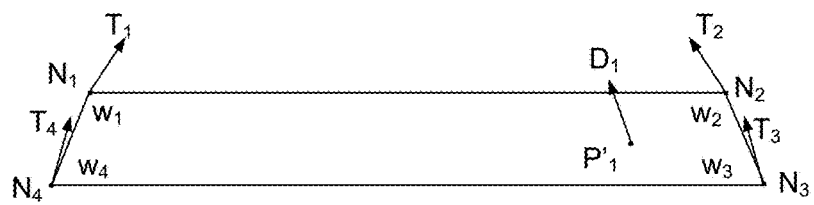
FIG. 10 is a diagram illustrating the method for defining the direction vector of an element from a point projected on the constraint grid.

With reference to FIG. 10, one then performs a calculation of the normalized weights $w_1$, $w_2$, $w_3$, $w_4$, at the projected point $P_1$, of the four nodes $N_1$, $N_2$, $N_3$, $N_4$ which are associated to the projected point, namely the four nodes that define the element to which the projected point belongs. These normalized weights, also called barycentric coordinates of the projected point, are calculated according to a method known per se, depending on the distance between the projected point and the nodes. Next one determines vector $D_1$ at the projected point by weighting the four vectors $T_1$, $T_2$, $T_3$, $T_4$ by their respective normalized weights $w_1$, $w_2$, $w_3$, $w_4$:

$$D_1 = \|T_1 \times w_1 + T_2 \times w_2 + T_3 \times w_3 + T_4 \times w_4\|$$

The direction vector of the element is then obtained by a transfer by normal projection of this vector $D_1$ to the central point $P_1$ of the element.

Figure 11:
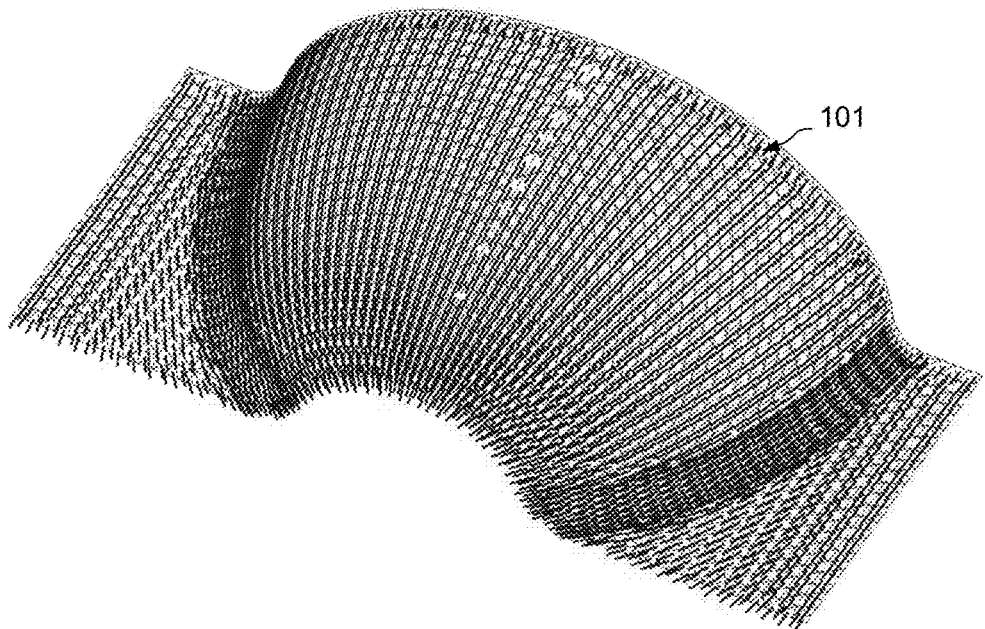
FIG. 11 is a perspective view of the vector field obtained according to the method of FIG. 8, with the constraint grid of FIG. 9.
Figure 12:
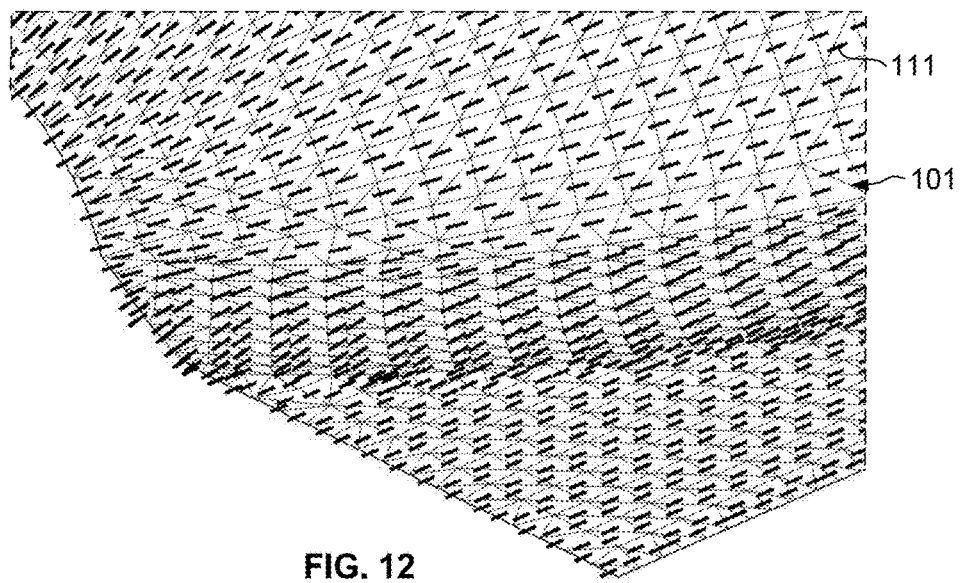
FIG. 12 is a partial enlarged view of FIG. 11.

FIGS. 11 and 12 illustrate the resulting vector field 101, in which a direction vector 111 is associated to each element.

Figure 13A:
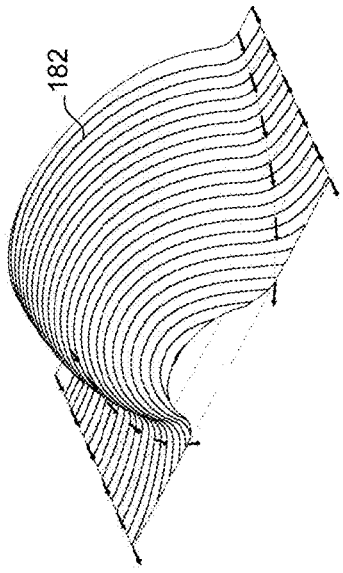
FIG. 13A is a perspective view of the fiber trajectories for a ply at 0° obtained from the vector field of FIG. 11.
Figure 14A:
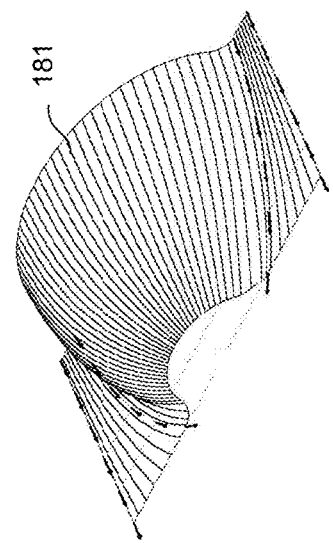
FIG. 14A is a perspective view of the fiber trajectories for a ply at 90° obtained from the vector field of FIG. 11.
Figure 13B:
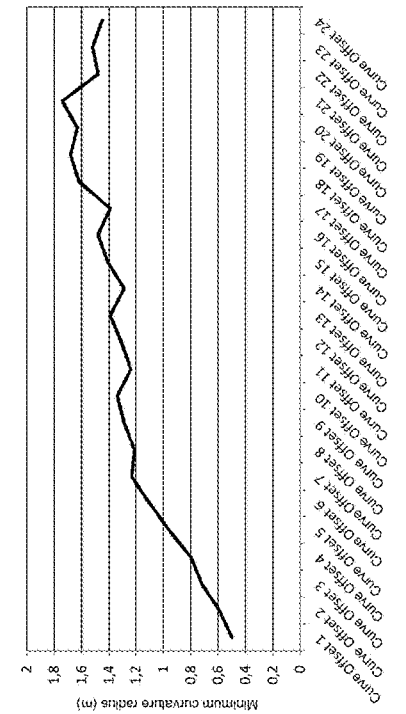
FIG. 13B presenting an analysis of the radius of curvature of said trajectories.
Figure 14B:
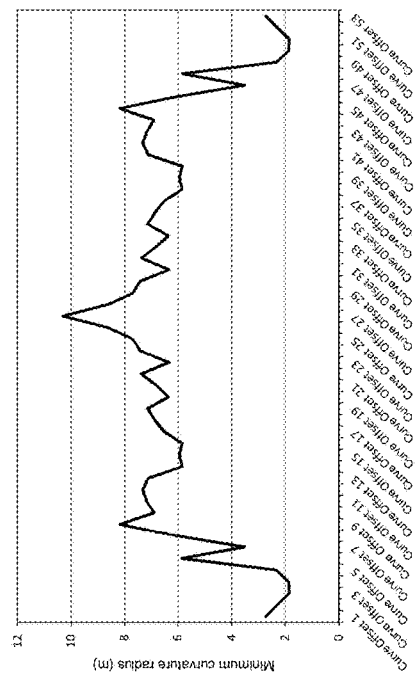
FIG. 14B presents an analysis of the radius of curvature of said trajectories.

FIGS. 13A and 13B respectively illustrate the trajectories 181 for a ply at 0°, obtained from this vector field, and the results of the corresponding analysis of the radius of curvature. FIGS. 14A and 14B respectively illustrate the trajectories 182 for a ply at 90°, obtained from this vector field, after a 90° rotation of the direction vectors, and the results of the corresponding analysis of the radius of curvature. Comparisons of FIGS. 6B and 7B with FIGS. 13B and 14B respectively show that the trajectories obtained with the constraint grid have larger minimum radius of curvatures than those trajectories resulting from a Cartesian rosette.

According to an alternative embodiment of the invention, as shown by the arrow in a discontinuous line in FIG. 8, the trajectories are generated directly from the constraint grid, without using the vector field.

Figure 15:
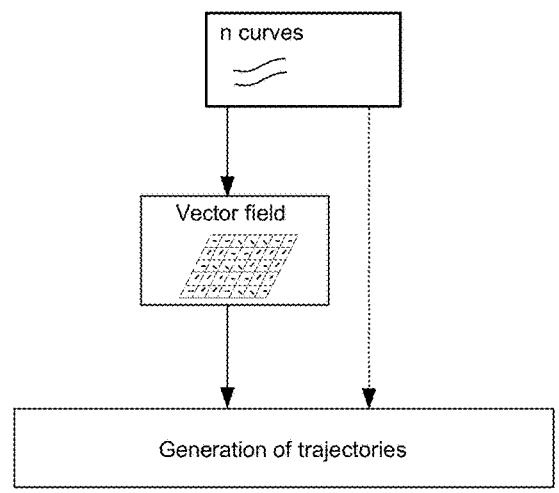
FIG. 15 is a diagram illustrating a method for defining trajectories, according to a second embodiment of the invention, using a vector field obtained from the constraint curves.

FIG. 15 illustrates a second embodiment in which a vector field is obtained from the constraint curves. Geometric constraints represented under the form of a constraint grid 2 in the previous embodiment are represented here under the form of constraint curves.

Figure 16:
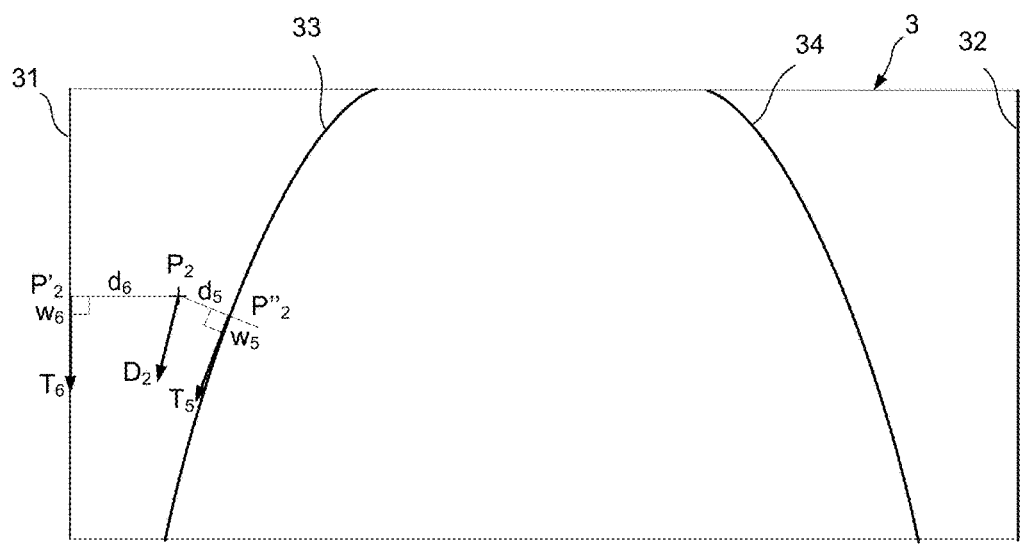
FIG. 16 is a diagram illustrating the method for defining a direction vector of the vector field from the constraint curves.

With reference to FIG. 16, the constraint curves, collectively referred to under reference 3, include:
two linear constraint curves 31, 32 corresponding to the outside edges 93 of the layup surface, and
two curved constraint curves 33, 34 corresponding to the generatrix lines of connecting radii between the central part and lateral parts of the layup surface.

To form the vector field, the direction vector of each element of the mesh is defined in the following manner.

Considering the central point $P_2$ of an element on FIG. 16, one performs a normal projection of a central point $P_2$, on the two closest constraint curves 31, 33, between which the central point is positioned. One then defines, at the projected points $P'_2$ $P''_2$, the two vectors $T_5$, $T_6$ tangent to the curves. One calculates the normalized weights $w_5$, $w_6$, at central point $P_2$, of the two projected points, these normalized weights being a function of the distances $d_5$ and $d_6$ between the central point and the projected points:

$$w_5=1-(d_5/(d_5+d_6))$$

$$w_6=1-(d_6/(d_5+d_6))$$

One then defines the vector $D_2$, which corresponds to the direction vector of the element, by weighting the two tangent vectors $T_5$, $T_6$ by their respective normalized weights $w_5$, $w_6$:

$$D_2=\|T_5\times w_5+T_6\times w_6\|$$

The vector $D_2$ of the element corresponds to the direction vector $D_2$ thus obtained. The vector field obtained from these constraint curves 3 is similar to that 101 previously obtained by means of the constraint grid.

According to an alternative embodiment of the invention, as shown by the arrow in a discontinuous line in FIG. 15, the trajectories are generated directly from the constraint grid.

Figure 17:
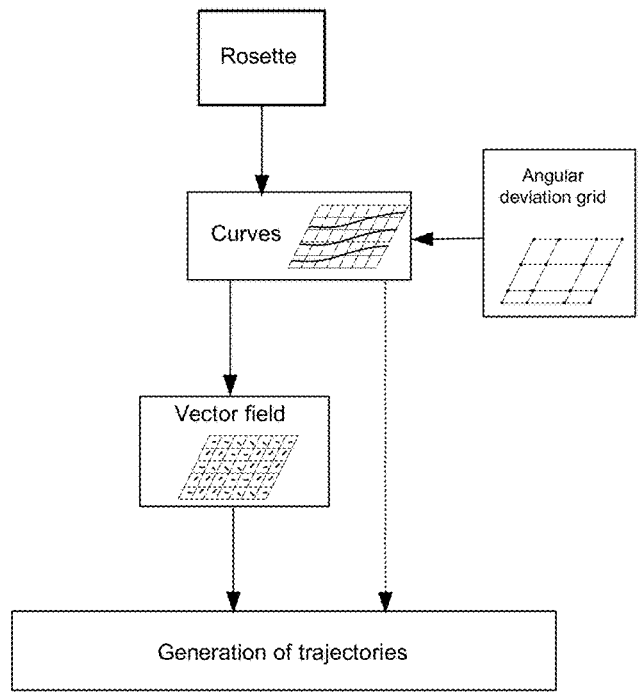
FIG. 17 is a diagram illustrating a method for defining the trajectories, according to a third embodiment of the invention, using a vector field obtained from the constraint curves, the constraint curves being obtained from an angular deviation grid.

FIG. 17 illustrates a third embodiment in which a vector field is obtained from the constraint curves which are defined from an angular deviation grid.

Figure 18:
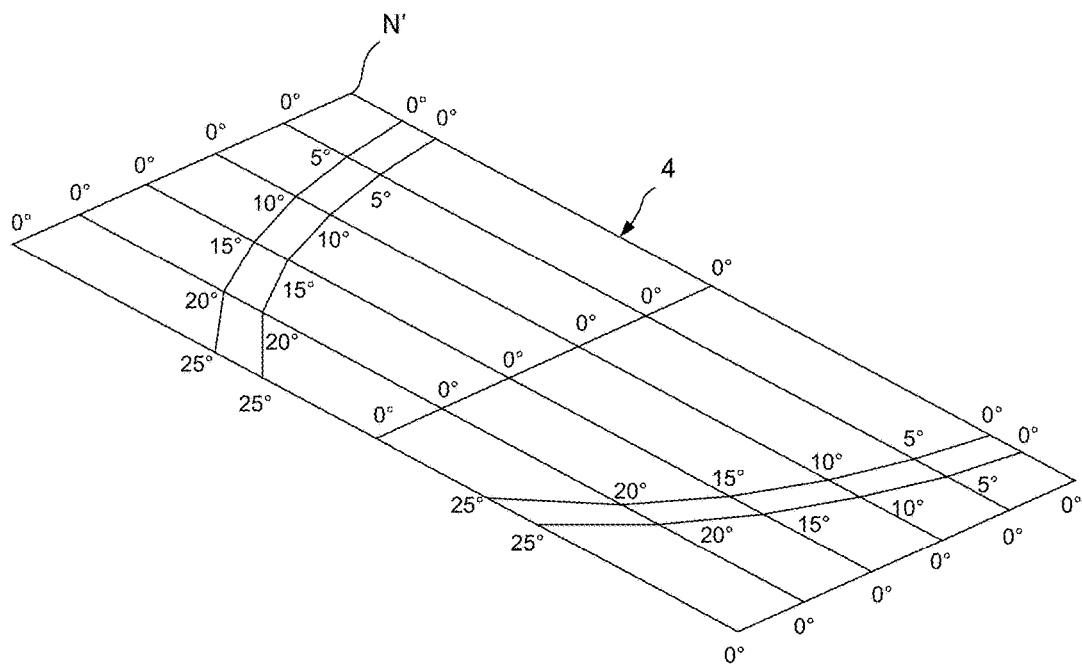
FIG. 18 is a schematic perspective view of the angular deviation grid defined from the lay-up surface.

With reference to FIG. 18, one defines in a first instance an angular deviation grid 4, in which each element is defined by four nodes N', and one assigns to each node of the grid a maximum angular deviation value. An example of deviation values assigned to the different nodes is given in FIG. 18.

Constraint curves are generated on the layup surface by defining for each constraint curve the propagation directions at different points of analysis also called propagation points. The propagation direction at a propagation point $P_3$ is defined in the following manner.

Figure 19:
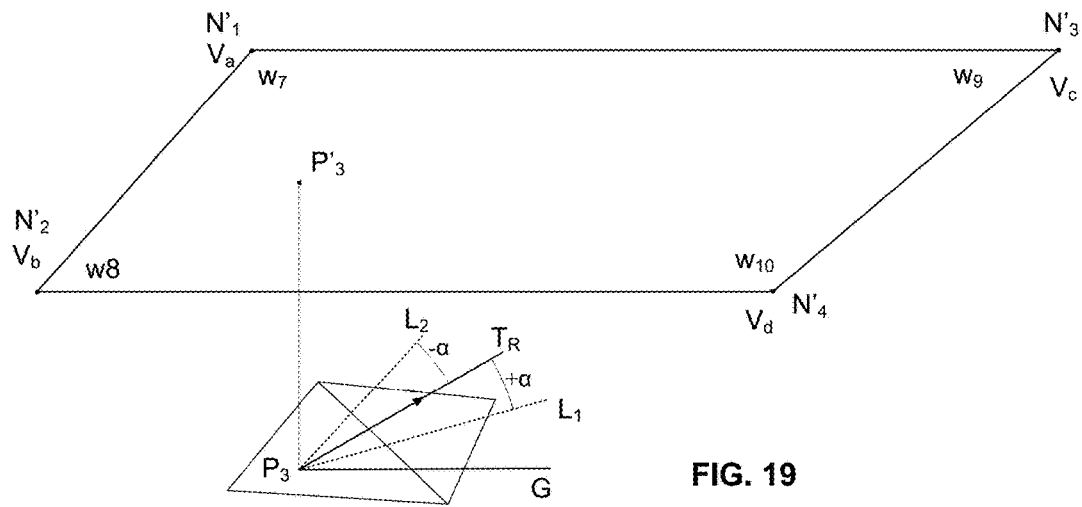
FIG. 19 is a diagram illustrating the method for generating the constraint curves from the angular deviation grid of FIG. 18.

With reference to FIG. 19, one defines a reference direction at the propagation point $P_3$, this reference direction $T_R$ being in this embodiment a direction obtained by a Cartesian rosette, by transfer by normal projection of the vector X of the global rosette on the plane of the element of the layup surface to which the propagation point $P_3$ belongs.

Next one performs a normal projection of the point $P_3$ on the angular deviation grid, the projected point $P'_3$ belonging for example to the element of the grid defined by the four nodes $N'_1$, $N'_2$, $N'_3$, $N'_4$ One performs a calculation of the normalized weights $w_7$, $w_8$, $w_9$, $w_{10}$, at the projected point $P'_3$, of the four nodes. These normalized weights, also called barycentric coordinates of the projected point, are calculated according to a method known per se, depending on the distance between the projected point and the nodes. One performs a weighting of the four maximum angular deviation values $V_a$, $V_b$, $V_c$, $V_d$ by the normalized weights to obtain an authorized maximum angular deviation value $\alpha$ associated to the projected point:

$$\alpha=w_7\times V_a+w_8\times V_b+w_9\times V_c+w_{10}\times V_d$$

Next one determines a tolerance sector around the reference direction $T_R$ by defining direction limits $L_1$ and $L_2$ at an angle of $+\alpha$ and $-\alpha$ around the reference direction. Furthermore one determines a geodesic direction G corresponding to the propagation direction at the propagation point $P_3$ of a geodesic curve.

This is followed by a reorientation of the reference direction within the limits of the authorized angular deviation value. If the geodesic direction G is included in the tolerance sector, then the propagation direction at the propagation point is defined as being the geodesic direction. If the geodesic direction is not included in the tolerance sector, then the propagation direction at the propagation point is defined as being the direction limit $L_1$ or $L_2$ the closest to the geodesic direction.

Figure 20:
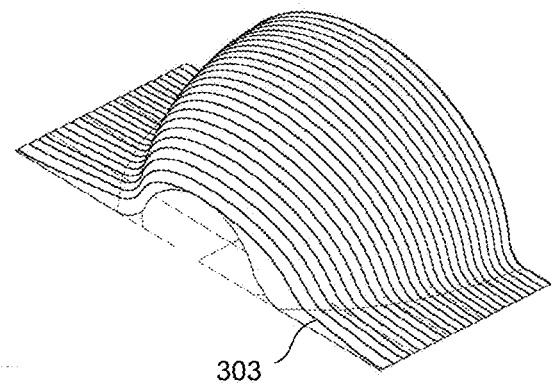
FIG. 20 is a view of constraint curves generated from the angular deviation grid of FIG. 18 and a classic rosette.

FIG. 20 illustrates an example of a constraint curve, designated under the general reference 303, obtained for plies at 90°, from a Cartesian rosette and the angular deviation grid, with the angular deviation values indicated in FIG. 18.

Figure 21:
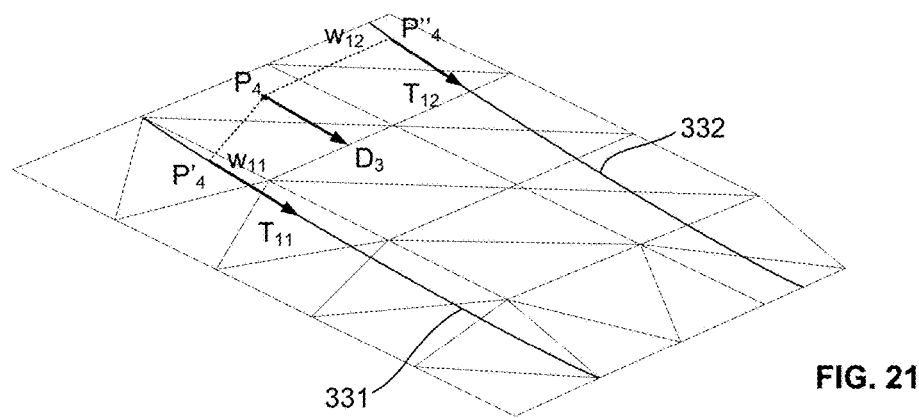
FIG. 21 is a diagram illustrating the method for defining the direction vector of an element from the angular deviation curves.

Obtaining a vector field is carried out according to the method described previously with constraint curves 3 of FIG. 16. The direction vector of each element of the mesh is defined in the following manner. With reference to FIG. 21, one performs a normal projection of the central point $P_4$ of the element on the two closest constraint curves 331, 332. Next one defines at the projected points $P'_4$, $P''_4$ the two vectors $T_{11}$, $T_{12}$ tangent to the curves. One calculates the normalized weights $W_{11}$, $W_{12}$, at the central point $P'$, of two projected points, these normalized weights being a function of the distances between the central point and the projected points. Then one defines the vector $D_3$, of the element, by weighting the two tangent vectors $T_{11}$, $T_{12}$ by their respective normalized weights $w_{11}$, $w_{12}$:

$$D_3=\|w_{11}\times T_{11}+w_{12}\times T_{12}\|$$

The direction vector of the element corresponds to the vector $D_3$, preferably after a 90° rotation of the vector $D_3$ to have a vector field concerning the plies at 0° by default.

Figure 22:
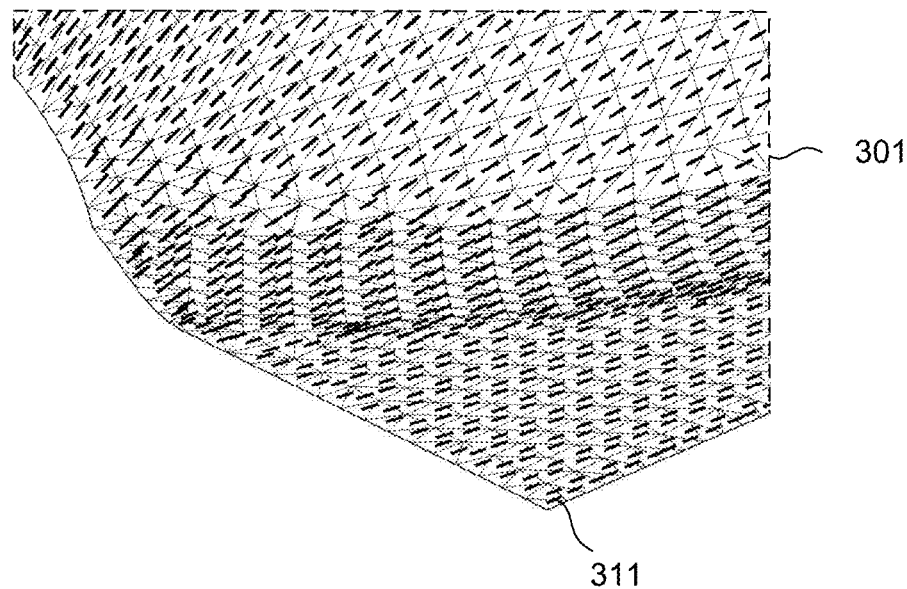
FIG. 22 is a partial view of the vector field obtained from the angular deviation grid.
Figure 23:
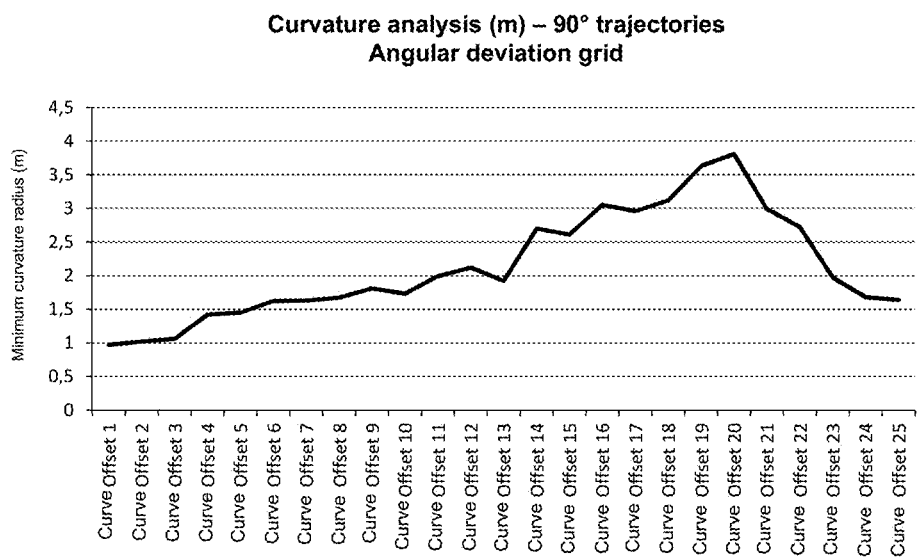
FIG. 23 is an analysis of the radius of curvature of the trajectories obtained from the vector field of FIG. 22 for a ply at 90°.

The vector field 301 obtained from these constraint curves is shown in FIG. 22, the vector field comprising a direction vector 311 associated to each element. The results of the analysis of the radius of curvature of the fiber trajectories, obtained from this vector field, or corresponding to the constraint curves 303 of FIG. 20 are shown in FIG. 23. These results show a significant increase in the minimum radius of curvatures of the trajectories relative to those of trajectories shown in FIG. 7B and simply obtained by means of a Cartesian rosette.

According to an alternative embodiment of the invention, as shown by the arrow in a discontinuous line in FIG. 17, the trajectories are generated directly from the angular deviation grid, without using the vector field.

According to another embodiment of the invention, the vector field is obtained from a constraint vector grid and an angular deviation grid. In this case, for the generation of the constraint curves according to the method explained above with reference to FIG. 19, the definition of the reference direction $T_R$ is made, not from the Cartesian rosette, but from the constraint vector grid, by normal projection of the point $P_3$ on the constraint grid and the definition of a vector $D_1$ according to the weighting method explained previously with reference to FIG. 10. The reference direction $T_R$ of the element is then obtained by a transfer by normal projection of this vector $D_1$ at the point $P_3$.

Figure 24:
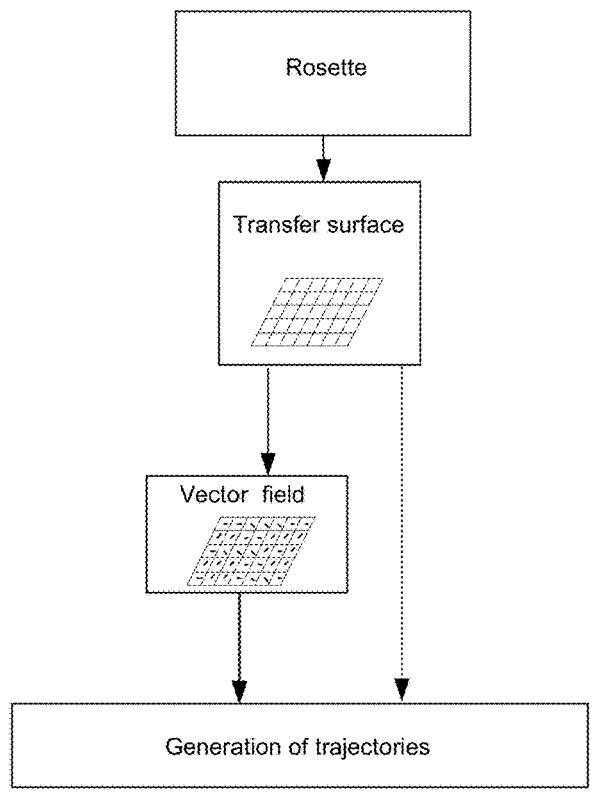
FIG. 24 is a diagram illustrating a method for defining the trajectories, according to a fourth embodiment of the invention, using a vector field obtained from a transfer surface.

FIG. 24 shows a vector field obtained by using a transfer surface for the transfer of a Cartesian rosette. This type of vector field is appropriate for the definition of the trajectories on a non-continuous lay up surface, such as the layup surface 109 illustrated in FIG. 26A. This layup surface is of generally frustoconical shape and comprises a central recess 194, forming ramps 195.

One defines a so-called continuous transfer surface which corresponds to a simplified surface of the lay-up surface. In this case, the transfer surface corresponds to the layup surface without its central recess. This transfer surface is defined by a so-called transfer mesh.

Figure 25:
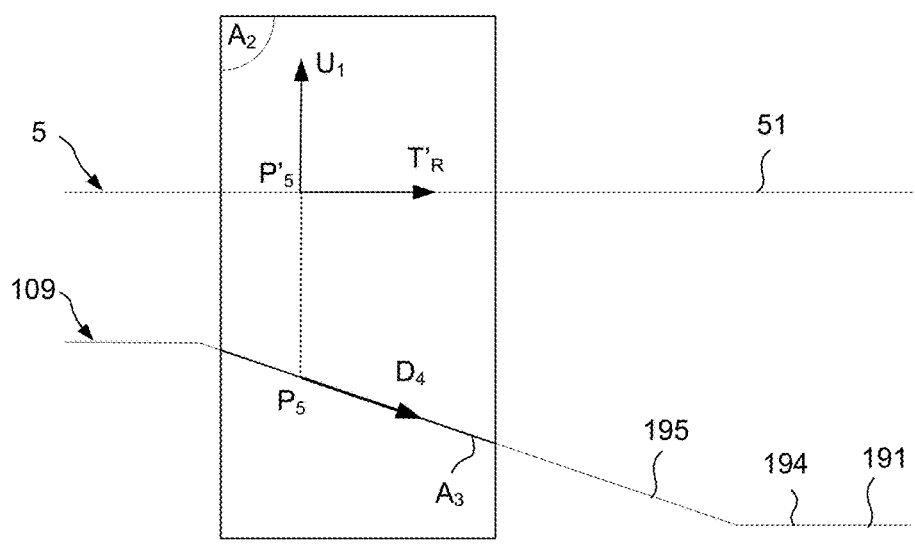
FIG. 25 is a diagram illustrating the method for defining a direction vector from a vector field from a transfer surface.

To form the vector field, the direction vector of each element of the mesh 191 of the layup surface is defined in the following manner, with reference to FIG. 25:
 definition of a projected point $P'_5$ obtained by normal projection of the central point $P_5$ of said element on the transfer mesh 51,
 definition of a reference direction $T'_R$ at said projected point $P'_5$, said reference direction here coming from a Cartesian rosette and being obtained by transfer of the X axis of the rosette on the plane of the transfer element to which the projected point $P'_5$ belongs;
 definition of the normal $U_1$ to the transfer element;
 definition of a cutting plane $A_2$, the cutting plane being defined by the projected point $P'_5$, the reference direction $T'_R$ and the normal $U_1$, and
 definition of the line of intersection $D_4$ of the cutting plane $A_2$ with the plane $A_3$ of the element to which the central point belongs, the direction vector of the element corresponding to the direction of this line of intersection.

Figure 26A:
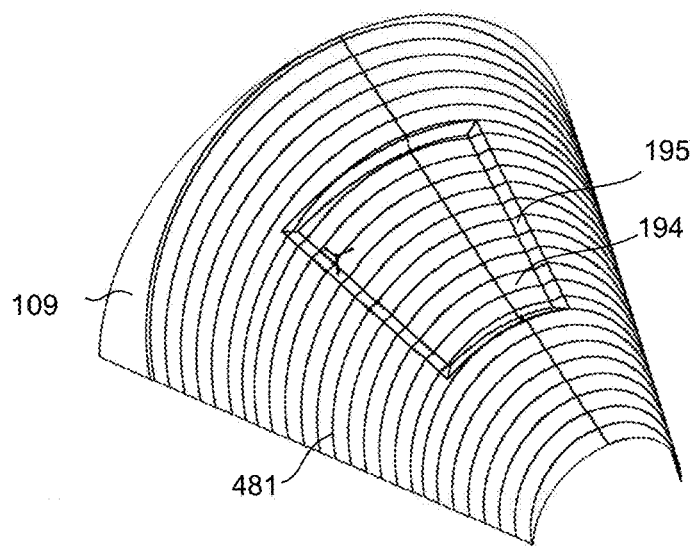
FIG. 26A is a perspective view of fiber trajectories obtained with a transfer surface and a Cartesian rosette.
Figure 26B:
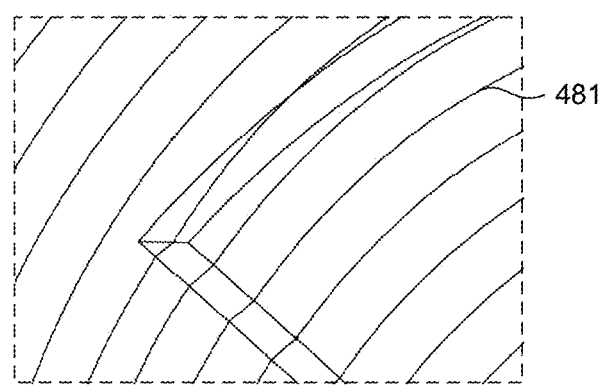
FIG. 26B is a partial enlarged view of FIG. 26A.
Figure 27:
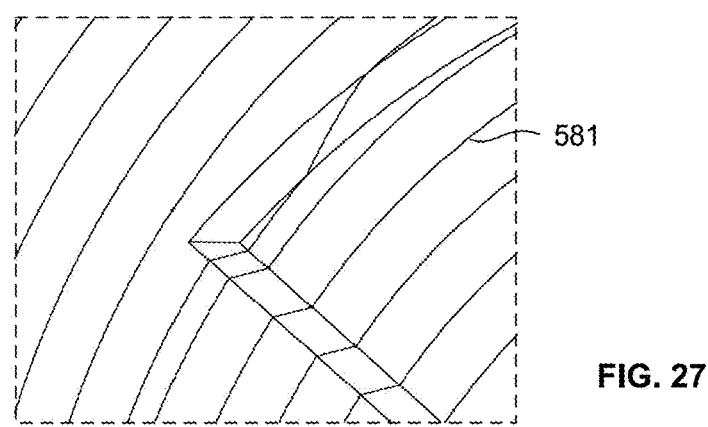
FIG. 27 is a view similar to that of FIG. 26B, the trajectories being obtained without the use of the transfer surface.

FIGS. 26A and 26B illustrate the trajectories 481 of the plies at 90°, obtained with such vector field, after a 90° rotation of the direction vectors. FIG. 31 illustrates the trajectories 581 obtained with a vector field defined from a rosette transfer directly on the layup surface, without use of the transfer surface.

According to another embodiment, the vector field is obtained from a constraint vector grid and a transfer surface. In this case, for the definition of the cutting plane $A_2$ according to the method explained above with reference to FIG. 25, the definition of the reference direction $T'_R$ is produced, not from the Cartesian rosette, but from the constraint vector grid, by normal projection of the point $P'_5$ on the constraint grid and the definition of a vector $D_1$ according to the weighting method explained previously with reference to FIG. 10. The reference vector $T'_R$ of the element is then obtained by a transfer by normal projection of this vector $D_1$ to the point $P'_5$.

Figure 28:
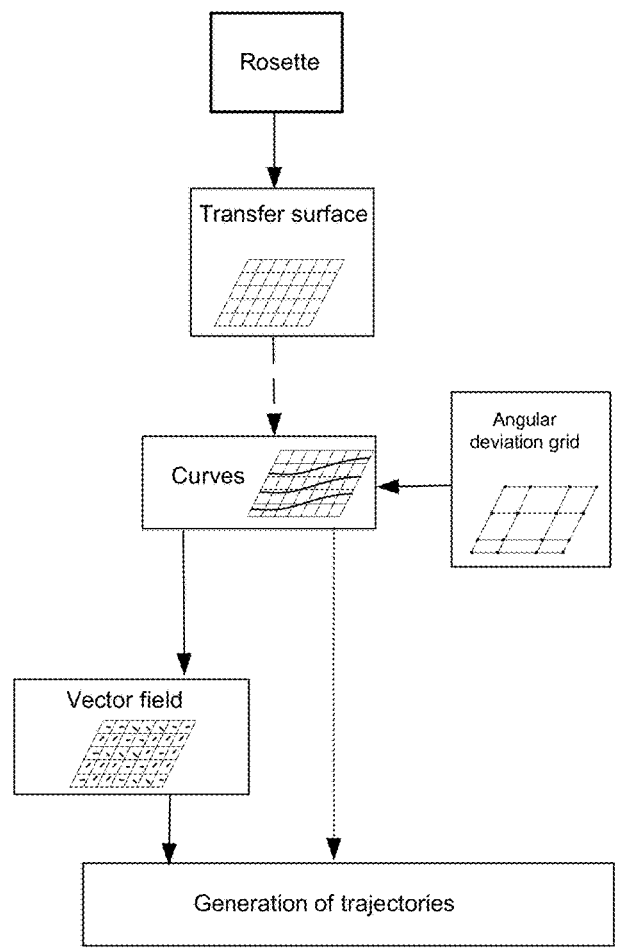
FIG. 28 is a flow diagram of a method for defining the trajectories, according to another embodiment of the invention, using a vector field obtained from an angular deviation grid and a transfer surface.
Figure 29:
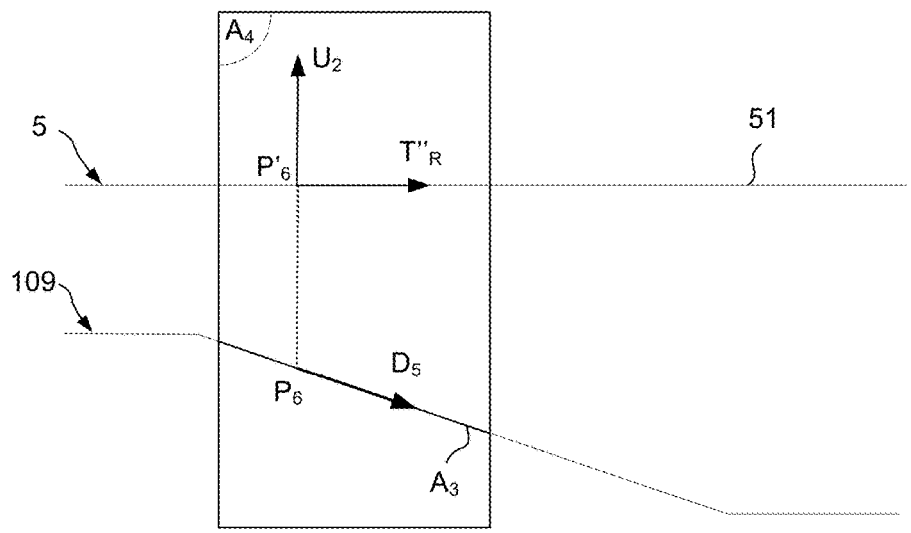
FIG. 29 is a diagram illustrating the method for defining a reference direction for the definition of a propagation direction for the method for FIG. 28; and, FIG. 30 is a diagram illustrating a shear analysis step from several vector fields.
Figure 30:
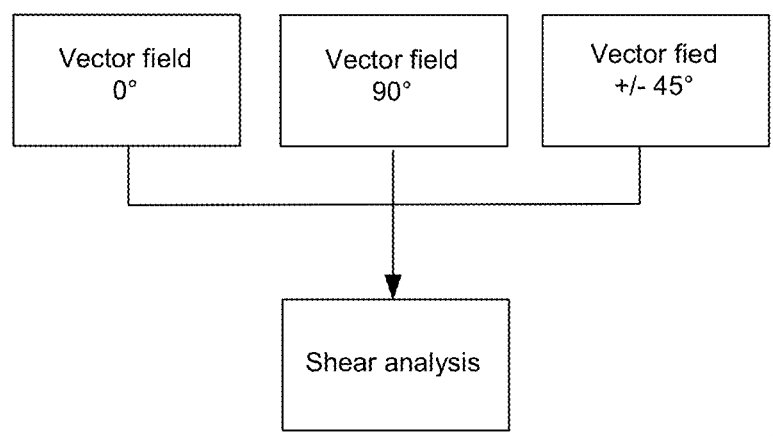

According to another embodiment illustrated in FIG. 28, the vector field is obtained from an angular deviation grid and a transfer surface. In this case, for the generation of constraint curves according to the method explained above with reference to FIG. 19, the definition of the reference direction $T_R$ for each propagation point $P_6$ is produced in the following manner, with reference to FIG. 29:
 definition of a projected point $P'_6$ obtained by normal projection of the propagation point $P_6$ on the transfer mesh 5,
 definition of a reference direction $T''_R$ at the projected point $P'_5$, the reference direction here coming from a Cartesian rosette and being obtained by transfer of the X axis of the rosette on the plane of the transfer element to which the projected point $P'_6$ belongs;
 definition of the normal $U_2$ to the transfer element;
 definition of a cutting plane $A_4$, said cutting plane being defined by the projected point $P'_6$, the reference direction $T''_R$ and the normal $U_2$,
 definition of the line of intersection $D_5$ between the cutting plane $A_4$ and the plane $A_5$ of the element, the reference direction $T_R$ corresponding to the direction of this line of intersection.

The direction of the propagation at the point $P_6$ is then obtained as described previously with reference to FIG. 19, by using the maximum angular deviation value obtained from the angular deviation grid.

According to another embodiment, the vector field is obtained from a constraint vector grid, an angular deviation grid and a transfer surface. In this case, for the definition of the cutting plane $A_4$ above, the definition of the reference direction $T''_R$ is made, not from the Cartesian rosette, but from the constraint vector grid, by normal projection of the point $P'_6$ on the constraint grid and definition of a vector $D_1$ according to the weighting method explained previously with reference to FIG. 10. The reference vector $T''_R$ of the element is then obtained by a transfer by normal projection of this vector $D_1$ at the point $P'_6$ According to other embodiments, such as illustrated in FIG. 1, the vector field is obtained from a finite element mesh FEM, including direction data associated to each element, such as a FEM mesh coming from a design software, for example software marketed under the trade name NASTRAN, with at least one angle associated to each element, and a rosette associated to the mesh. This FEM mesh can be used directly as an input of the method according to the invention, or preferably be converted under the form of vector grid or constraint curves.

Furthermore, a vector field obtained according to the invention can be reintroduced as an input of the method according to the invention to obtain a new vector field.

Depending on the type of layup surface, different vector fields can be used for the definition of trajectories of the plies of different orientations. By way of example, with reference to FIG. 28, three different vector fields are defined:

vector field for plies at 0°
vector field for plies at 90°
vector field for plies at +/−45°

The use of a vector field enables shear analyses to be performed quickly, in order to verify that the angle between the trajectories of different orientations are well within an acceptable range of values. Advantageously, as previously, the direction vectors of the vector fields are all defined for an orientation at 0°. In the case of the vector field for the plies at 90°, a 90° rotation of the direction vectors is performed to generate trajectories at 90°. Similarly, in the case of the field vectors for the plies at +/−45°, a rotation of more or less 45° of the direction vectors is performed to generate the trajectories at +45° or −45°. These different vector fields with the direction vectors defined for an orientation at 0°, allows a quick and easy comparison of the direction vectors for the shear analysis.

Although the invention has been described in conjunction with several specific embodiments, it is obvious that it is in no way limited thereto and includes all technical equivalents of the described means as well as their combinations if they are within the scope of the invention.

The invention claimed is:

1. A method for the manufacture of a part by an automatic fiber layup machine configured to apply at least one ply of a composite material to a layup surface based on a plurality of fiber trajectories, the method comprising:
   selecting a plurality of analysis points, each analysis point representing a point on the layup surface;
   receiving the definition of a constraint, each constraint having a form selected from the group consisting of: a plurality of constraint curves and a constraint grid;
   for each analysis point, determining the direction of a fiber by:
      deriving a plurality of constraint vectors proximate the analysis point from the constraint,
      calculating a normalized weight of each constraint vector of the plurality of constraint vectors based on a distance between the analysis point and the constraint vector,
      assigning the direction of the fiber at the analysis point based on the plurality of constraint vectors proximate the analysis point and the normalized weight of each constraint vector of the plurality of constraint vectors; and
   creating the plurality of trajectories based on the direction of the fiber at each analysis point;
   providing the plurality of trajectories to the automatic fiber layup machine.

2. The method of claim 1, wherein the constraint is a constraint grid, each element of the constraint grid is defined by four nodes, at least one constraint vector is associated with each node of the constraint grid;
   wherein the normalized weight of each constraint vector of the plurality of constraint vectors based on a distance between the analysis point and the constraint vector is determined by:
      definition of a projected point by normal projection of an analysis point on the constraint grid,
      calculation of the normalized weights, at the projected point, of the four nodes; and
   wherein assigning the direction of the fiber at the analysis point based on the plurality of constraint vectors proximate the analysis point and the normalized weight of each constraint vector of the plurality of constraint vectors comprises:
      weighting of the four constraint vectors by the normalized weights to obtain a vector at the projected point, and assigning the direction of the fiber at the analysis point to a normal projection of the vector at the analysis point.

3. The method of claim 1, wherein the constraint is a plurality of constraint curves;
   wherein deriving a plurality of constraint vectors proximate the analysis point from the constraint comprises:
      normal projection of the analysis point on two constraint curves between which the analysis point is positioned to produce two projected points, and
      definition of a constraint vector at each of the two projected points as a tangent to the constraint curve at the projected point;
   wherein the normalized weight of each constraint vector of the plurality of constraint vectors based on a distance between the analysis point and the constraint vector is determined by:
      calculation of the normalized weights of each of the two projected points at the analysis point.

4. The method of claim 3, including the steps of receiving the definition of an angular deviation grid, each element of said angular deviation grid being defined by four nodes, and the association to each node of the angular deviation grid of at least one maximum angular deviation value, the definition of a constraint curve comprising the definition of propagation directions at different analysis points, and wherein assigning the direction of the fiber at the analysis point based on the plurality of constraint vectors proximate the analysis point and the normalized weight of each constraint vector of the plurality of constraint vectors comprises:
   obtaining a first reference direction at said analysis point from the direction data associated to a method for transfer,
   the normal projection of said point on the angular deviation grid,
   calculation of the normalized weights at the projected point, of the four nodes of the element of the angular deviation grid,
   weighting of said four maximum angular deviation values of the element by said normalized weights to obtain a maximum angular deviation value associated to said analysis point,
   the reorientation of said first reference direction from said maximum angular deviation value to obtain the propagation direction at said analysis point.

5. The method of claim 4, wherein the step of reorientation of the reference direction comprises:
   the definition of a tolerance sector around the first reference direction by defining direction limits at an angle of more or less the maximum angular deviation value ($\alpha$) associated to said analysis point;
   determining a geodesic direction at said analysis point;
   the propagation direction at the propagation point being equal to the geodesic direction if the geodesic direction is included in the tolerance sector, and is equal to the direction limit closest to the geodesic direction, if the geodesic direction is not included in the tolerance sector.

6. The method of claim 1, further comprising the definition of a transfer mesh of a transfer surface corresponding to a simplified surface, substantially continuous with the layup surface, the direction of a fiber at an analysis point of the layup surface being obtained by:
   definition of a projected point obtained by normal projection of an analysis point on the transfer mesh, definition of a second reference direction at said projected point, from direction data associated to a method for transfer, definition of the normal to the transfer element, definition of a cutting plane said cutting plane being defined by the projected point, said second reference direction and said normal, definition of the line of intersection of the cutting plane with the plane of the element, the direction of the fiber at said analysis point being obtained from the direction of this line of intersection.

7. A method according to claim 4 in combination with the steps of claim 2, wherein the first reference direction at the analysis point is obtained from a constraint grid by:

definition of a projected point by normal projection of said analysis point on the constraint grid, calculation of normalized weights, at the projected point, of the four nodes, weighting of the four constraint vectors by said normalized weights to obtain a vector at said projected point, the first reference direction being obtained by projection of said vector at the analysis point.

8. A method according to claim 6, in combination with the steps of claim 4, wherein the first reference direction at the analysis point is obtained from a transfer surface, by:

definition of a projected point by normal projection of the analysis point of said element on the transfer mesh, definition of a second reference direction at said projected point definition of the normal to the transfer element, definition of a cutting plane said cutting plane being defined by the projected point, said second reference direction and said normal, definition of the line of intersection of the cutting plane with the plane of the element, the first reference direction corresponding to the direction of said line of intersection.

9. A method according to claim 6, in combination with the steps of claim 2, wherein the second reference direction at said projected point is obtained from a constraint grid by:

definition of a second projected point by normal projection of the point of the transfer element, on the constraint grid, calculation of the normalized weights at the second projected point of the element of the constraint grid of the four nodes of said element, weighting of the four constraint vectors by said normalized weights to obtain a vector at said second projected point, the second reference direction being obtained by projection of said vector at the projected point of the transfer element.

10. The method of claim 1, further comprising laying up at least one ply of a composite material by onto the layup surface by the automatic fiber layup machine.

11. The method of claim 1, further comprising:

receiving the definition of a mesh of the layup surface;

receiving the definition of direction data associated with at least one transfer method; and generating a vector field by associating each element of the mesh of the layup surface with at least one direction vector obtained by transferring of the direction data according to the transfer method;

wherein the direction of a fiber at each analysis point is further determined based on the vector field.

* * * * *